United States Patent [19]

Bauers et al.

[11] Patent Number: 4,895,245
[45] Date of Patent: Jan. 23, 1990

[54] ROUND CONTAINER ORIENTING SYSTEM

[75] Inventors: Barton M. Bauers, Wallingford; John L. Raudat, North Madison; Raymond C. Ehlers, Jr., Haddam, all of Conn.

[73] Assignee: Standard-Knapp, Inc., Portland, Conn.

[21] Appl. No.: 215,827

[22] Filed: Jul. 6, 1988

[51] Int. Cl.⁴ .............................................. B65G 47/26
[52] U.S. Cl. ........................................ 198/458; 198/445
[58] Field of Search ............... 198/445, 446, 458, 462, 198/453; 53/56

[56] References Cited

U.S. PATENT DOCUMENTS

| | | | |
|---|---|---|---|
| 2,941,650 | 6/1960 | Clinton | 198/446 X |
| 3,444,980 | 5/1969 | Wiseman | 198/445 |
| 3,710,918 | 1/1973 | Babunovic | 198/445 |
| 4,029,195 | 6/1977 | Hartness et al. | 198/445 |
| 4,060,166 | 11/1977 | Hartness et al. | 198/446 |
| 4,129,207 | 12/1978 | Cupp | 198/445 |
| 4,173,276 | 11/1979 | Raudat et al. | 198/446 X |
| 4,231,463 | 11/1980 | Vamvakas | 198/446 |
| 4,457,121 | 7/1984 | Johnson et al. | 53/56 |
| 4,844,234 | 7/1989 | Born et al. | 198/458 |

FOREIGN PATENT DOCUMENTS

| | | | |
|---|---|---|---|
| 0212027 | 3/1987 | European Pat. Off. | 198/445 |
| 0568497 | 1/1933 | Fed. Rep. of Germany | 198/445 |
| 3613724 | 10/1988 | Fed. Rep. of Germany | 198/445 |

*Primary Examiner*—Robert J. Spar
*Assistant Examiner*—Lyle Kimms
*Attorney, Agent, or Firm*—McCormick, Paulding & Huber

[57] ABSTRACT

A nested pattern of round containers accumulates on an infeed conveyor between side guides so spaced as to accommodate the containers in nested columns. Individual venturi, or lane conveyors, are non-linear and achieve a lateral spreading of the center columns without relying on a fixed lane guide or divider. Outer lane conveyors do the same immediately downstream of this center column spreading action and the containers are then fed to a case packer in orderly columns.

10 Claims, 4 Drawing Sheets

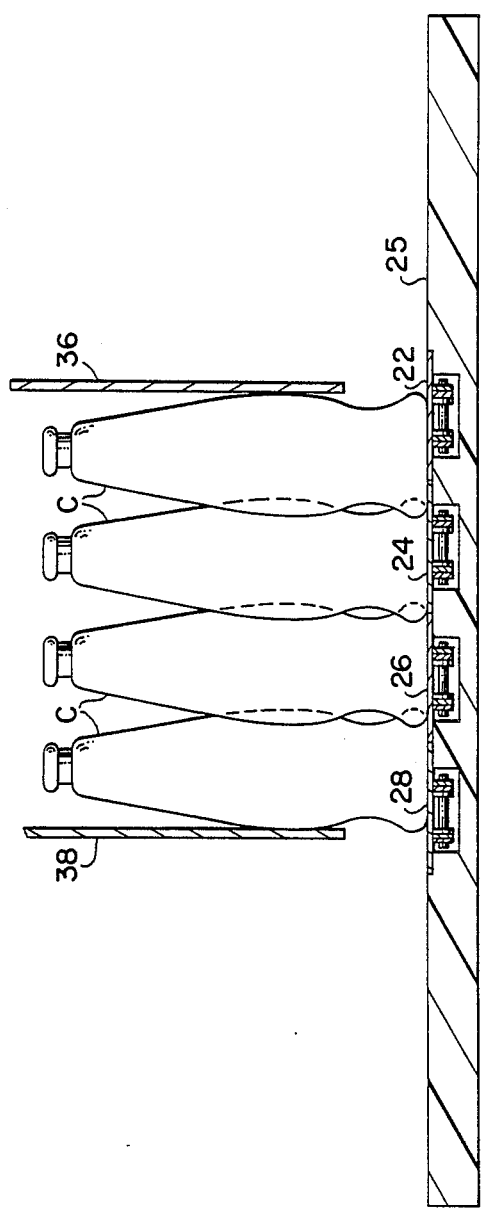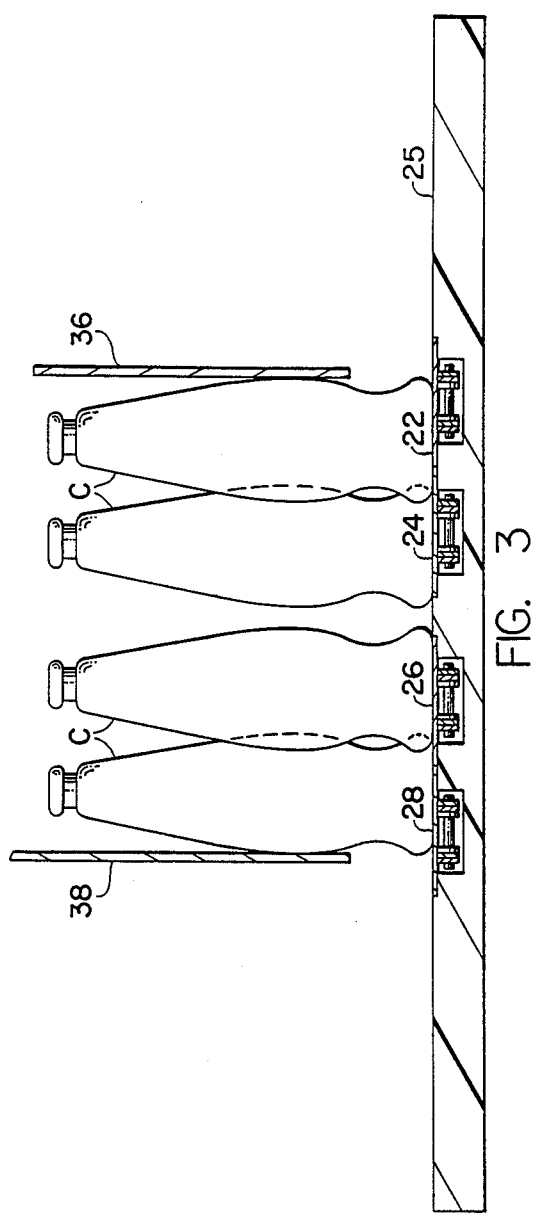

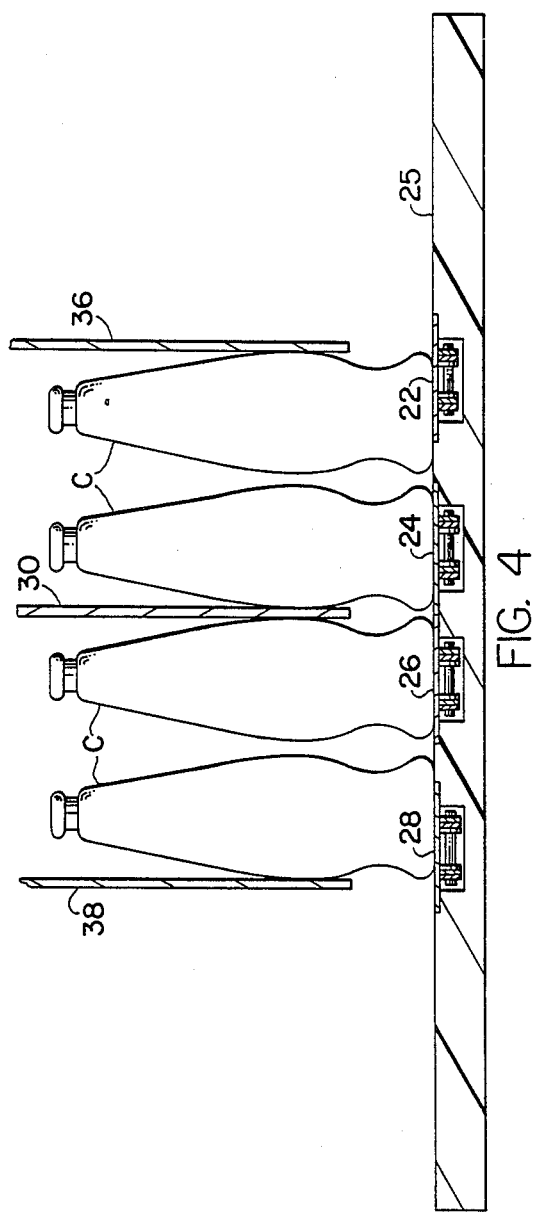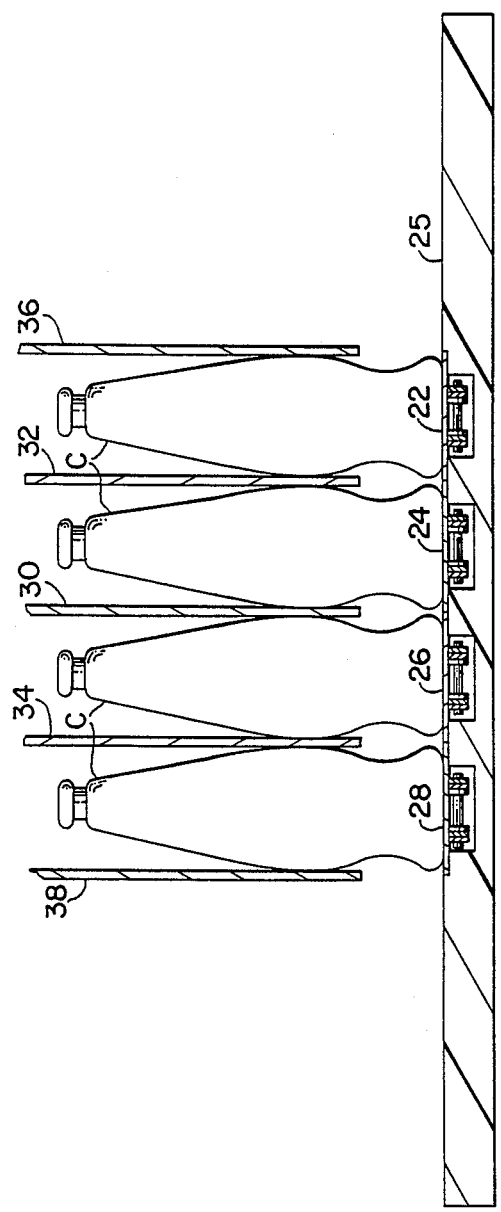

ROUND CONTAINER ORIENTING SYSTEM

BACKGROUND OF INVENTION

Conventional case packers for bottles or cans require that the containers be oriented in side-by-side columns for entry into the packer. However, the containers are generally provided in a nested configuration prior to being received by such a packer and therefor must be reoriented for entry into the packer. U.S. Pat. No. 3,444,980 issued to Wiesman in 1969 illustrates a solution to this problem wherein a center lane guide is provided at the apex of several generally parallel lane guides such that one lane of end-to-end containers is between formed spaced guides, and other lanes provided to either side of the one lane but with a somewhat wider spacing for the lane guides than that for the one lane. The approach shown in Wiesman, and other prior art approaches to solving this problem, requires that the fixed leading edge or nose of the lane guides be struck by the advancing articles so as to shift the articles laterally in order to break up the nested pattern as the articles move downstream on an underlying conveyor.

The general purpose of the present invention is to provide a container orienting system for moving the nested articles laterally away from one another so as to form discrete parallel lanes or columns without requiring that the leading edge of the lane divider itself be successively struck by each advancing container. With the higher speeds of present day case packers it is imperative that the process of orienting the containers be accomplished at higher speeds. Thus, the continual bumping contact of the on going containers against the leading edge of a lane guide or divider must be avoided, and that is the general object of the present invention.

SUMMARY OF INVENTION

In its presently preferred form the container orienting system of the present invention includes not only the underlying conveyor for advancing the articles in nested relationship between side guides, but also includes several side-by-side lane venturi conveyors associated with each of the lanes or columns of articles to be formed. Two adjacent such lane conveyors have upstream segments longitudinally aligned with the containers in their nested configuration, and immediately downstream thereof mutually divergent segments of these lane or venturi conveyors shift the containers on one lane conveyor away from those on the second or adjacent lane conveyor. Once the containers have been shifted away from one another by these non-linear lane or venturi conveyors a separation wall may be provided downstream of the so shifted containers in order to preserve the orderly flow of containers in columns for entry in the packer. So too, once the containers have been provided in lanes a conventional underlying conveyor is provided for feeding the containers from the container orienting system in orderly rows between conventional lane guides into a case packer.

As a result of utilizing more than one underlying conveyor in the orienting system according to the present invention the speed of the individual lane or venturi conveyors can be provided at somewhat less than the speed of the infeed conveyor means assuring that a number of nested articles are provided at the upstream or infeed end of the conveyor system. Further, the underlying conveyor that feeds the packer can be operated at a speed greater than the lane speed of the venturi conveyors to assure that adequate product is provided for entry into the packer. The number of side-by-side columns required to feed containers into a given case packer will determine the number of venturi or lane conveyors required to practice the present invention.

BRIEF DESCRIPTION OF THE DRAWINGS

FIG. 2 is a vertical section taken generally on the line 2—2 of FIG. 1, but illustrating the containers in full lines.

FIG. 3 is a sectional view similar to FIG. 2, but taken on the line 3—3 of FIG. 1.

FIG. 4 is a view similar to FIGS. 2 and 3 but taken on the line 4—4 of FIG. 1.

FIG. 5 is a sectional view similar to FIGS. 2, 3 and 4 but taken on the line 5—5 of FIG. 1.

DETAILED DESCRIPTION

Figure 1:
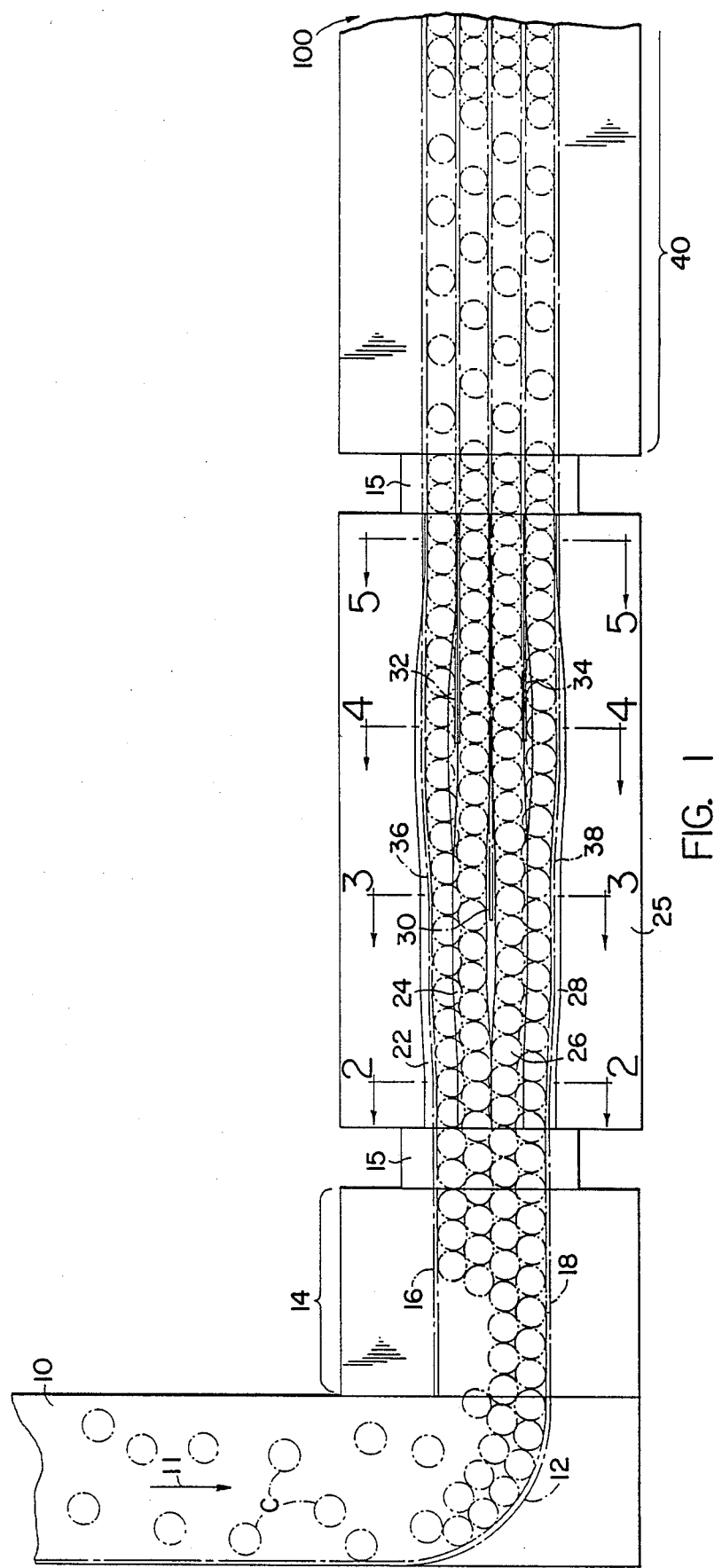
FIG. 1 is a plan view not to scale illustrating a container orienting system in accordance with the present invention.

Turning now to the drawings in greater detail, a container orienting system constructed in accordance with the present invention is shown in FIG. 1 as comprising a cross conveyor 10 moving in the direction of the arrows 11, 11. A fixed deflector 12 is provided to transfer containers C, C onto an infeed conveyor 14. Normally this infeed conveyor would carry the containers to a case packer (not shown). In FIG. 1, however, a novel container orienting system is provided for handling the containers C, C.

The typical case packer (not shown) must receive slugs or arrays of containers C, C in orderly columns and rows for deposit in an upwardly open packing case (not shown). Such a case packer is preferably provided at the right hand end portion of the container orienting system shown in FIG. 1, as indicated generally by the arrow 100. Such case packers may operate on an intermittent basis so as to form successive arrays of containers to be packed or such packers may operate continuously as shown in U.S. Pat. No. 4,457,121 issued July 3, 1984 to the assignee herein. In a continuous motion packer of the type shown in said patent, and in present day case packers generally, the containers must be handled at high speed.

The speeds of present day case packers have been limited by state of the art container orienting systems such as that shown for example in U.S. Pat. No. 3,444,980 because of the fact that the initial nested configuration of the containers must be opened up to provide the containers in columns. This container reorienting has generally been accomplished by causing the containers to strike a fixed divider or lane guide provided above the surface of a single underlying conveyor. Such a structure for breaking up the nested pattern of containers is unsatisfactory in the high speed environment of present day container handling and case packing lines.

The presently preferred form of container orienting system of the present invention includes at its upstream end a relatively wide infeed conveyor 14 onto which the containers C, C are diverted by the fixed arcuate deflector 12 so that the containers assume a nested pattern on this conveyor 14. The deflector 12 is aligned with an infeed conveyor side guide 18 and a similar side guide 16 is provided in parallel relationship to it so as to accommodate the nested container configuration therebetween. This product configuration is typical of case packer lines generally but in accordance with conventional practice the conveyor 14 would extend up to the case packer itself. The container orienting system to be described includes deadplates 15,15 and additional conveyors for orienting the containers as they move downstream toward the case packer 100.

In accordance with the present invention the deadplate 15 is provided at the downstream end of the infeed conveyor 14 with the side guides 16 and 18 extending across the deadplate to maintain the nested configuration of the containers as shown in FIG. 1.

Adjacent the downstream end of the deadplate 15 at least two and preferably four individual lane or venturi conveyors 22, 24, 26 and 28 are provided in closely spaced side-by-side relationship to one another to engage the underside of the nested containers C, C as best shown in FIG. 2. Each individual lane or venturi conveyors 22, 24, 26 and 28 is chain driven and includes container engaging plates that are connected to the chain links to define an active conveyor run which extends from the section line 2—2 downstream to at least the section line 5—5 of FIG. 1. In accordance with the present invention these normally straight running lane conveyors 22, 24, 26 and 28 are adapted to follow non-lineal paths best shown in FIG. 6 as defined by a conveyor track structure 25. This track structure 25 comprises a machined plate fabricated from a plastic material having suitable lubrication properties so as to minimize the wear associated with the running chain in each of the lane or venturi conveyors. The plastic plate structure 25 defines several uniquely shaped grooves to accommodate the chains and associated upper container engaging plates for achieving a lateral shifting movement of these container engaging plates and therefor of the chains in order to achieve separation of the nested containers and assimilation of these containers into orderly columns or lanes.

Figure 6:
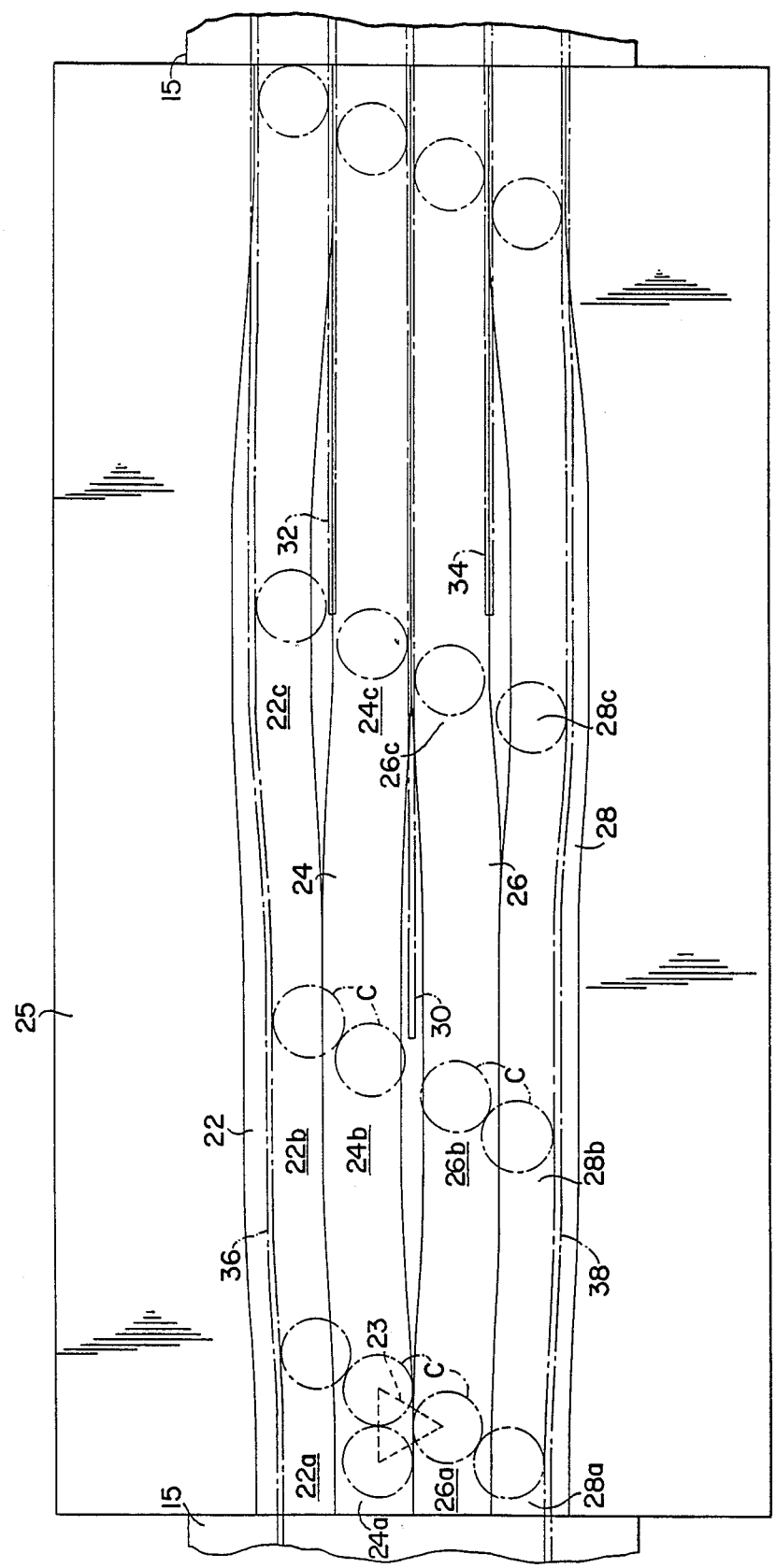
FIG. 6 is a plan view of the track defining non-linear paths for the lane conveyors illustrating in expanded scale the center portion of FIG. 1 without the containers and the conveyors.

As suggested in FIG. 6 each of these venturi conveyors 22, 24, 26 and 28 has an upstream segment 22a, 24a, 26a and 28a that is longitudinally aligned with at least one of these nested containers. More particularly one such conveyor is assigned with one container and a second or adjacent venturi conveyor is associated with two adjacent tangent containers as suggested by the equilateral triangle indicated generally at 23 in FIG. 6. Thus, the side-by-side lane or venturi conveyors continue the nested pattern as the containers move off the deadplate 15.

Each of these side-by-side lane or venturi conveyors further includes divergent conveyor segments 22b, 24b, 26b and 28b downstream of these longitudinally aligned upstream segments respectively. More particularly, the embodiment shown entails breaking up the nested pattern of round containers into four lanes, and it will be apparent that the nested pattern also comprises four nested lines of containers. It is an important feature of the present invention that the two central lane or venturi conveyors 24 and 26 have mutually divergent segments downstream of their lineal upstream segments for shifting the containers on the one venturi conveyor away from those on the other or second venturi conveyor. FIG. 3 shows the result of these two divergent conveyor segments and the resulting separation between the containers. Having created such separation a center lane guide 30 or wall can be provided between the two center columns of containers without having the containers abruptly changing their direction as a result of contact with such a center lane guide or wall as has been the case with prior art container orienting systems generally. See FIG. 4 where such a wall 30 is in place.

In the embodiment shown four columns or lanes of articles are to be accommodated and therefor the two central venturi or lane conveyors 24 and 26 are provided with mutually convergent segments 24c and 26c downstream of the mutually divergent venturi conveyor segments 24b and 26b respectively. The outermost lanes or columns of containers provided on conveyors 22 and 28 are diverted away from the center line of the conveyor system by mutually divergent venturi conveyor segments 22c and 28c respectively. This geometry for the converging venturi conveyor segments 24c and 26c and diverging segments 22c and 28c provides a separation between each of the center lanes and the outermost lanes as suggested in FIG. 4. Once such separation has been achieved between the containers a lane guide or separating wall, 32 and 34 respectively, can be conveniently provided to maintain the desired separation between the containers for further transfer downstream to the case loader 100. See FIG. 5 where such walls 32 and 34 are so provided.

The speed of all four lane or venturi conveyors (R) is preferably less then the speed (S) of the infeed conveyor 14 in order to maintain the nested pattern preliminary to the lane separating function described above for these lane conveyors 22, 24, 26 and 28. Once the containers have been provided in lanes as indicated at the downstream end of these lane or venturi conveyors 22, 24, 26 and 28 a discharge conveyor 40 is provided to accelerate the containers within these lanes as defined by the lane guides 30, 32, 34 and side guides 36 and 38. Thus, the discharge conveyor 40 can conveniently accelerate the containers and preferably operates at a speed (Q) greater than the speed (R) of the lane or venturi conveyors 22, 24, 26 and 28.

In accordance with a presently preferred form of the present invention the ratio of the above mentioned conveyor speeds are approximately as follows: $R/S = 2/3$ and $Q/R = 6/5$.

We claim:

1. A container orienting system for feeding round containers of diameter (D) into a case packer with side-by-side lanes of such width as to accept the containers in (N) side-by-side columns, said orienting system comprising:
   (a) infeed conveyor means operating at a lineal speed (S) and including longitudinally extending infeed side guides for accumulating said round containers in a nested pattern wherein each container is tangent to at least two other containers such that the vertical central axes of these three containers define an equilateral triangle, one side of the triangle being formed by said at least two other containers and said triangle side oriented parallel to said longitudinally extending side guides,
   (b) at least two side-by-side venturi conveyors, one of said venturi conveyors having an upstream segment longitudinally aligned with said each container, a second of said two venturi conveyors having an upstream segment that is longitudinally aligned with said one triangle side, (c) said side-by-side venturi conveyors having divergent segments, said divergent segments being mutually divergent laterally with respect to one another downstream of said upstream segments for shifting said one venturi conveyor laterally away from said second venturi conveyor, (d) lane guide means including a container separation wall between said shifted containers on said one and said second venturi conveyor divergent segments, (e) discharge conveyor means downstream of said venturi conveyors, and including longitudinally extending discharge lane guides for restricting movement of said containers to movement in orderly columns for entry into a case packer.

2. The system according to claim 1 wherein said venturi conveyors operate at a speed (R) less than the speed (S) of said infeed conveyor means.

3. The system according to claim 2 wherein said discharge conveyor means operates at a speed (Q) greater than the speed (R) of said venturi conveyors.

4. The system according to claim 3 wherein the ratio $R/S = \frac{2}{3}$ and the ratio $Q/R = 6/5$.

5. The system according to claim 1 wherein said venturi conveyors further include convergent segments downstream of said mutually divergent venturi conveyor segments respectively, said convergent segments being mutually convergent with respect to one another downstream of said divergent segments, and laterally spaced venturi conveyor lane guides aligned with said discharge lane guides.

6. The system according to claim 5 further characterized by additional venturi conveyors arranged laterally outwardly of said at least two venturi conveyors respectively, said additional venturi conveyors having segments adjacent said divergent segments of said at least two venturi conveyors respectively for continuing the nested container pattern in cooperation with said one and said second venturi conveyor respectively, and each of said additional venturi conveyors having divergent segments adjacent said convergent segments of said one and said second venturi conveyors respectively, said divergent segments shifting said nested containers on said additional conveyors away from those on said one and said second venturi conveyors respectively.

7. The system according to claim 6 wherein said additional venturi conveyors further include convergent segments adjacent said one and said second venturi conveyor downstream of said convergent segments of said one and said second venturi conveyors.

8. The system according to claim 7 wherein said venturi conveyors operate at a speed (R) less than the speed (S) of said infeed conveyor means.

9. The system according to claim 8 wherein said discharge conveyor means operates at a speed (Q) greater than the speed (R) of said venturi conveyors.

10. The system according to claim 9 wherein the ratio $R/S = \frac{2}{3}$ and the ratio $Q/R = 6/5$.

* * * * *